(12) United States Patent
Chundi et al.

(10) Patent No.: US 12,262,090 B2
(45) Date of Patent: Mar. 25, 2025

(54) CUSTOMIZED CLOCK BASED SKIP FUNCTIONALITY

(71) Applicant: Adeia Guides Inc., San Jose, CA (US)

(72) Inventors: Charishma Chundi, Andhra Pradesh (IN); Reda Harb, Issaquah, WA (US); Rajendra Pandey, Karnataka (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/103,764

(22) Filed: Jan. 31, 2023

(65) Prior Publication Data

US 2023/0171470 A1 Jun. 1, 2023

Related U.S. Application Data

(63) Continuation of application No. 17/308,469, filed on May 5, 2021, now Pat. No. 11,601,722.

(51) Int. Cl.
| | | |
|---|---|---|
| *H04N 21/472* | (2011.01) | |
| *G06F 3/04847* | (2022.01) | |
| *G06F 3/04883* | (2022.01) | |
| *H04N 21/6587* | (2011.01) | |

(52) U.S. Cl.
CPC ... *H04N 21/47217* (2013.01); *G06F 3/04847* (2013.01); *G06F 3/04883* (2013.01); *H04N 21/6587* (2013.01)

(58) Field of Classification Search
CPC .......... H04N 21/47217; H04N 21/6587; G06F 3/04847; G06F 3/04883
See application file for complete search history.

(56) References Cited

U.S. PATENT DOCUMENTS

| | | | |
|---|---|---|---|
| 2008/0107402 | A1 | 5/2008 | Angiolillo et al. |
| 2008/0229204 | A1* | 9/2008 | Johnson ........... H04N 21/47217 386/E5.064 |
| 2012/0280922 | A1* | 11/2012 | Lee ..................... G06F 3/04855 345/173 |
| 2014/0258854 | A1* | 9/2014 | Li ........................ H04N 21/414 715/702 |
| 2020/0302671 | A1* | 9/2020 | Poling ................ G06F 3/04883 |
| 2022/0360857 | A1 | 11/2022 | Chundi et al. |

\* cited by examiner

*Primary Examiner* — Oschta I Montoya
(74) *Attorney, Agent, or Firm* — Haley Guiliano LLP

(57) ABSTRACT

Methods and systems for dynamically navigating content are provided. Media content is generated for display on a user device. A selectable indicator for incrementally skipping through the media content is also generated. An input indicating selection of the selectable indicator is received and, in response to receiving the input indicating the selection of the selectable indicator, at least two selectable navigation settings are generated for display. Each navigation setting is associated with a navigation interval within the content. An input of the selection of the navigation setting and the navigation interval is received. The current play position of the media content item is shifted based on the selected navigation setting and the navigation interval.

17 Claims, 16 Drawing Sheets

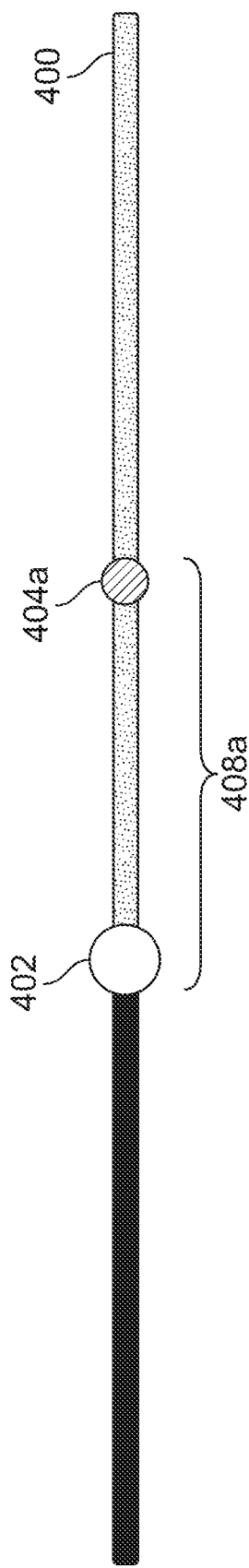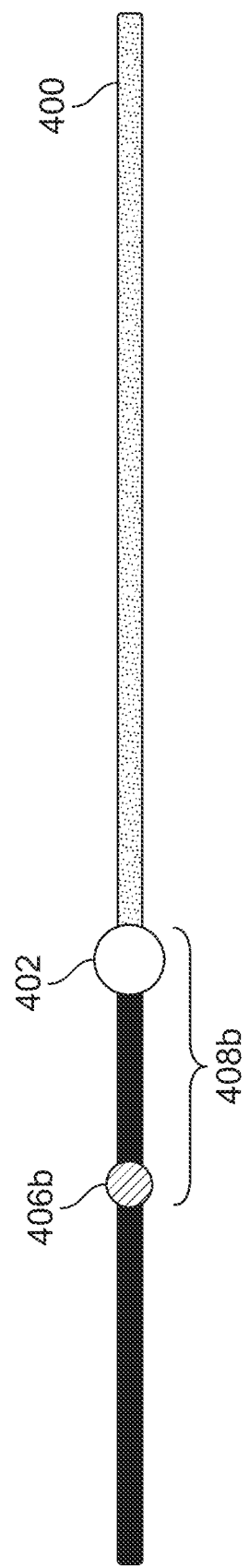

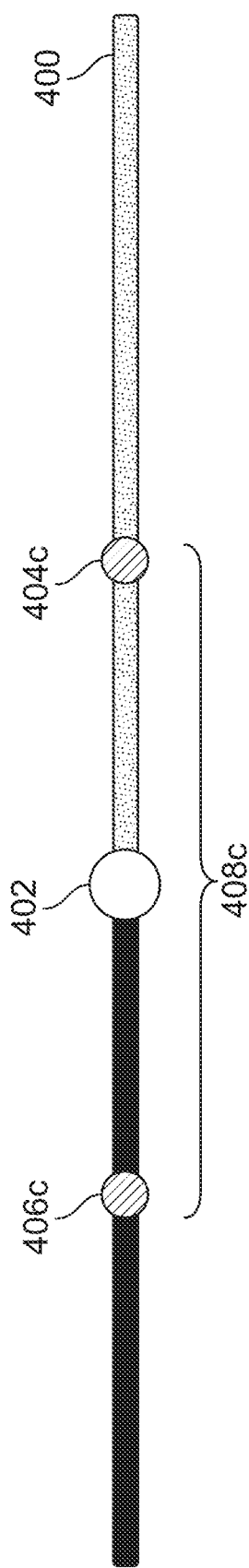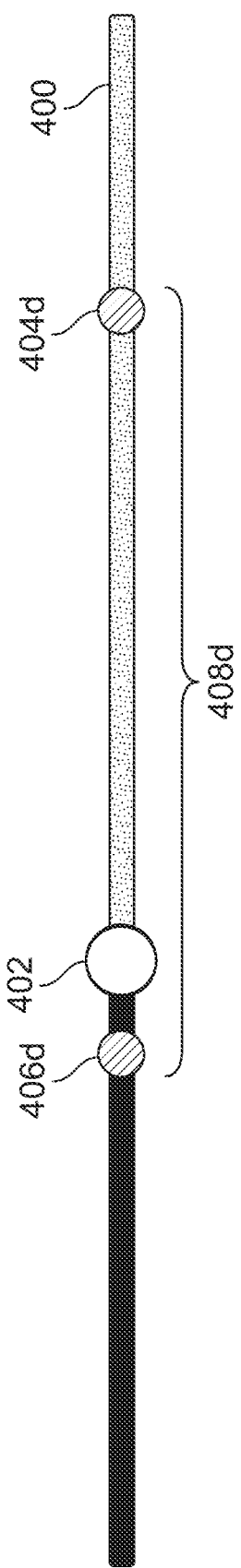

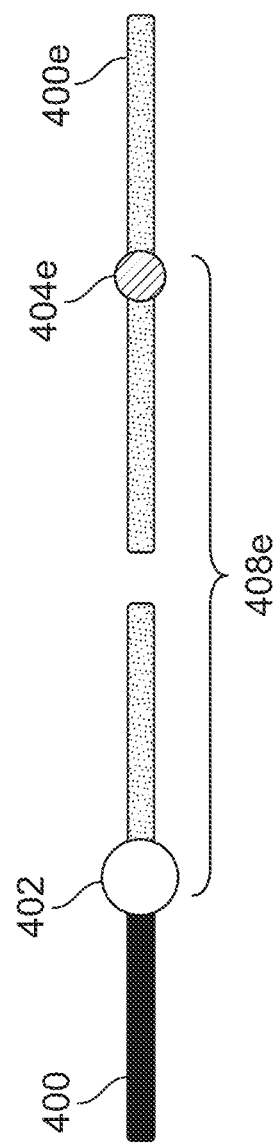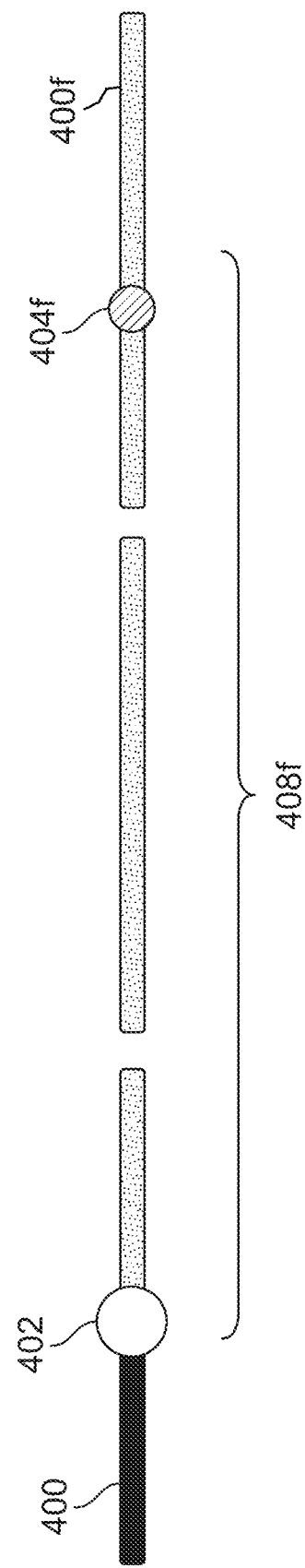

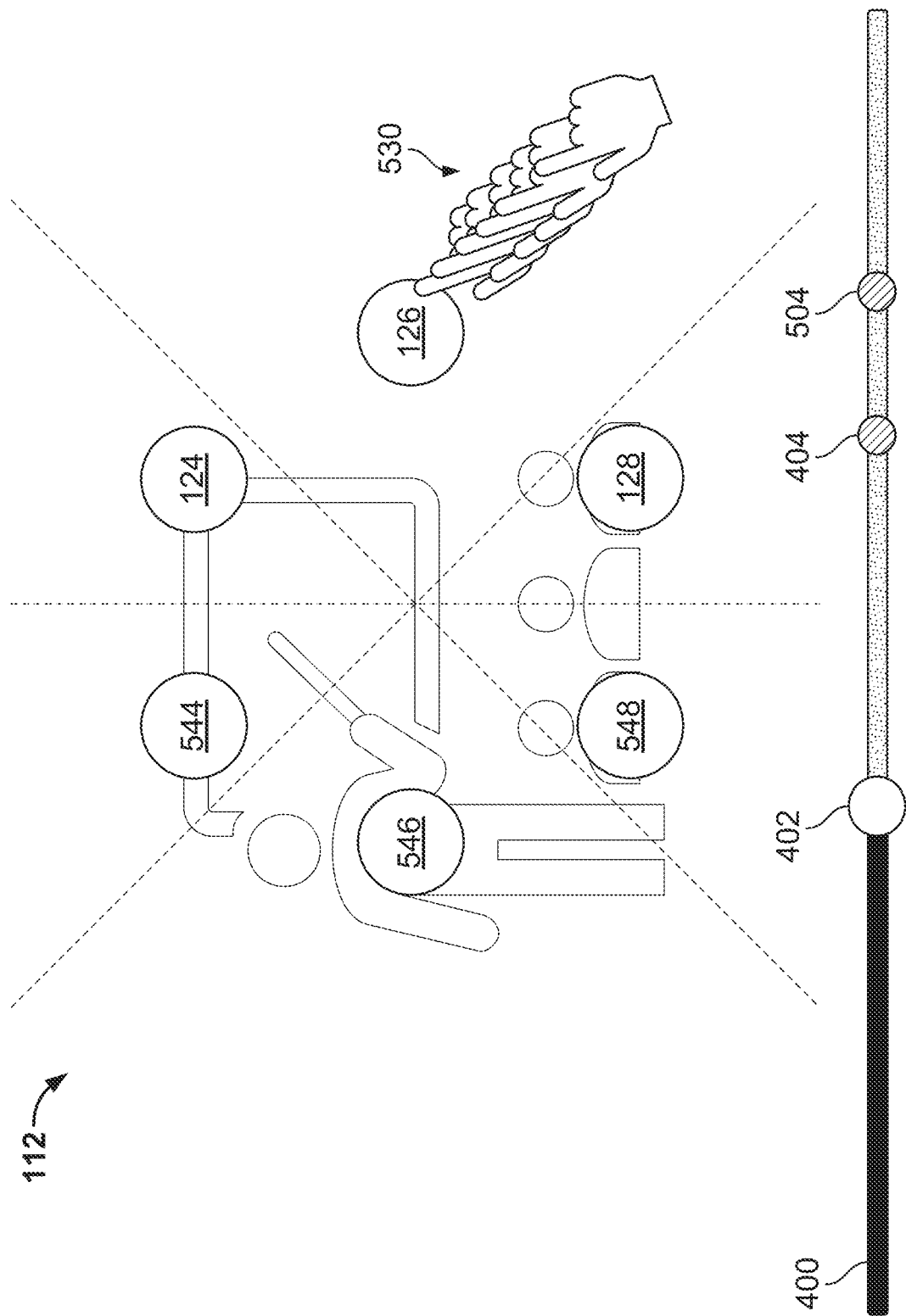

CUSTOMIZED CLOCK BASED SKIP FUNCTIONALITY

CROSS REFERENCE TO RELATED APPLICATIONS

This application is a continuation of U.S. patent application Ser. No. 17/308,469, filed May 5, 2021, the disclosures of which is hereby incorporated by reference herein in its entirety.

BACKGROUND

The present disclosure relates to media play systems and methods and, more particularly, to systems and methods related to media play operations, such as shifting a current play position in media content (e.g., a media asset) that is being viewed.

SUMMARY

Audio and video media devices, such as dedicated recorders, televisions, and more recently handheld devices (e.g., smartphones and tablets) offer their users the flexibility to perform various media content manipulations, offline (disconnected from Internet access) or online (while connected to the Internet, wirelessly or with wire). Benefiting from modern-day technology advancements, media device users enjoy flexible media content (e.g., videos and audiobooks) consumption at, and during, a time of their choosing, at a location of their choosing, and with a media device of their choosing.

Media devices are ubiquitous, available on a variety of platforms, and implemented on and compatible with a variety of networks and electronic devices. Continuously growing in application, it is no surprise that each media device type features a distinct user experience. For example, a smart television or a digital recorder, in combination with a large screen display, offers the consumer no less than a theater-like viewing experience, yet a smart handheld device offers the consumer the convenience of mobility. Where an audio player may not have or need graphics features, a video player typically does. Where a large form factor media player, such as a desktop computer, may be void of touchscreen media content functionality, a small form factor media player, such as a smartphone, is nearly expected to have a touchscreen feature.

Media content functionality, like a touchscreen seekbar for media content skip operations, is among more recent electronic entertainment device improvements offering the consumer flexibility and convenience to rapidly navigate media content with a simple touch of the finger. Accordingly, different media device types offer different user experiences, flexibility, and convenience.

A conventional seekbar, for example, enables a user to navigate through a video/audio in a forward or backward direction. The seekbar length is not proportional to the length of audio/video. Instead, the seekbar's length is the same for all video/audio content. It is relatively easy to use the seekbar for an audio/video content item with a small duration when compared to ones with a long duration. Often, media devices come with a time-lapse or skip button, which allows a user to skip a video or audio forward or backward, typically by a relatively short period of time such as 5 or 10 seconds. Like the seekbar, the time skip is not proportional to the length of the audio/video. That is to say that, if a video is short, for example, 20 seconds, a 10-second skip feature would not be very useful because, after use, the user will miss a large proportion of the video. Conversely, for a video of longer length, for example, 30 minutes, a 10-second skip would be inefficient to use to skip to anything longer than a few minutes into the video. Thus, there is a need for improved media navigation tools for navigating to the desired play position that are adapted to the length of the video.

Improved content navigation mechanisms, techniques, and systems described herein are introduced to provide a better viewing and content consumption experience for a viewer of media content such as video, audio, or the like.

In one approach, a method for navigating media content is provided. The method comprises generating for display, on a user device, the media content and a selectable indicator for incrementally skipping through the media content, and receiving an input indicating selection of the selectable indicator. In response to receiving the input indicating the selection of the selectable indicator, the method further comprises generating for display at least two selectable navigation settings, wherein each navigation setting is associated with a navigation interval within the content, the navigation intervals of each navigation setting being different from one another; receiving an input indicating a selection of one of the selectable navigation settings; receiving an input indicating the navigation interval to be associated with the selected navigation setting; and receiving a further input of the selectable indicator. In response to receiving the further input of the selectable indicator, the method further comprises navigating from a current play position of the media content to a shifted play position of the media content based on the selected navigation setting and the navigation interval and generating for display on the user device the media content from the shifted play position.

In some examples, each navigation setting differs by an order of magnitude. The order of magnitude may be powers of 10, such as 10 seconds, 100 seconds, or 1000 seconds. The order of magnitude may be denominations of time, for instance, seconds and minutes; seconds, minutes and hours; minutes and hours; or seconds and hours.

In some examples, the method further comprises utilizing a scaling parameter, wherein the scaling parameter translates the navigation interval to an amount of time, wherein navigating from the current play position to the shifted play position is further based on the scaling parameter. For example, the user may select a navigation setting and input a navigation interval that is then scaled to a time that is used to advance the current play position of media content to shifted position. In some examples, each selectable navigation setting is associated with a corresponding scaling parameter, and utilizing the scaling parameter is based on the selection of the navigation setting.

In some examples, the input indicating the navigation interval further comprises detecting a physical touch, dragging, and releasing of the selected navigation setting across a display. For example, after the selectable navigation settings have been generated, a user may select the navigation setting (such as seconds, minutes, or hours) and drag the generated navigation setting icon or indicator across the display. In some examples, a length of a dragged path of the navigation settings determines the navigation interval for said setting. In some examples, the direction of the dragging is determined to determine a forward (advance) or backward (rewind) indication.

In some examples, the shifted play position is determined by adding the navigation interval to the current play position or subtracting the navigation interval from the current play position. In some examples, the content comprises a first media content item with a first length and a second media content with a second length. In some examples, the method further comprises applying the navigation interval to the first media content resulting in an expected shifted position. In some examples, the expected shifted position exceeds the first length of the first media content item. In response to the expected shifted position exceeding the first length of the first media content item, the second media content item is played at a play position equal to the expected shifted position less the first length, called the overrun position. The overrun play position is less than the second length. For example, if the first media content item is 10 minutes long and is currently at a play position of 5 minutes, and the user selects and inputs a navigation interval of 10 minutes; the expected play position will exceed the length of the first media content item by 5 minutes. Therefore, in some examples, the second media content item will have an overrun play position of 5 minutes. In some examples, there is provided a third media with a third length. If the expected shifted position exceeds the first length and the second length, then the third media is played at a play position equal to the expected shifted position less (e.g., minus or subtracting) the first length and the second length (i.e. the overrun position). Therefore, in these examples, a navigation interval applied to a first media content item initiates the playback of a second or third media in a playlist.

In some examples, the method further comprises a first selectable navigation setting associated with a first navigation interval in seconds, a second selectable navigation setting associated with a second navigation interval in minutes, and a third selectable navigation setting associated with a third navigation interval in hours. In some examples, wherein the first length of the first media content item is less than one hour, then the method comprises a first selectable navigation setting associated with a first navigation interval in seconds and a second selectable navigation setting associated with a second navigation interval in minutes.

In some examples, the method further comprises displaying on the content display interface at least one of an interval marker representing the navigation interval, a preview window representing the content at the shifted play position, an elapsed time indication of the shifted play position, wherein the content display interface includes temporal markers indicating positions within the content represented by the seekbar, and wherein the content display interface includes a marker representing an expected shift position during the reception of the input of the navigation interval.

In another approach, there is provided a system for navigating media content item, the system comprising control circuitry to generate for display, on a user device, the media content item and a selectable indicator for incrementally skipping through the media content item, receive an input indicating selection of the selectable indicator. In response to receiving the input indicating the selection of the selectable indicator, the control circuitry is further configured to generate for display at least two selectable navigation settings, wherein each navigation setting is associated with a navigation interval within the content, the navigation interval of each navigation setting being different from one another, receive an input indicating a selection of one of the selectable navigation settings, receive an input indicating the navigation interval to be associated with the selected navigation setting, receive a further input of the selectable indicator. In response to receiving the further input of the selectable indicator, the control circuitry is further configured to navigate from a current play position of the media content item to a shifted play position of the media content item based on the selected navigation setting and the navigation interval and generate for display on the user device the media content item from the shifted play position.

In another approach, there is provided a system for navigating media content, the system comprising means for executing the methods as described herein.

In another approach, there is provided a non-transitory computer-readable medium having instructions encoded thereon that when executed by control circuitry cause the control circuitry to perform the methods as described herein.

In another approach, there is provided a computer program comprising instructions which, when executed by a computer, cause the computer to carry out the method as described herein.

Other approaches and embodiments are disclosed herein. Media content manipulation mechanisms, techniques, and systems are introduced to facilitate convenient, rapid, and precise navigation of media content.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIGS. 4A, 4B, 4C, 4D, 4E, and 4F are illustrative diagrams of how the navigation interval of media content may be defined and computed, according to some examples of the disclosure;

FIGS. 5A, 5B, 5C, 5D, and 5E are illustrative diagrams of a plurality of navigation settings, according to some examples of the disclosure;

DETAILED DESCRIPTION

In an aspect of the disclosure, systems and methods implement an interface for content navigation. The interface is configured to detect activation of a navigation process using the interface, display a plurality of navigation settings associated with navigation intervals within the content, detect a selection of one navigation setting, detect an input relating to the navigation interval, and navigate the content with the navigation interval based on the navigation amount.

Figure 1:
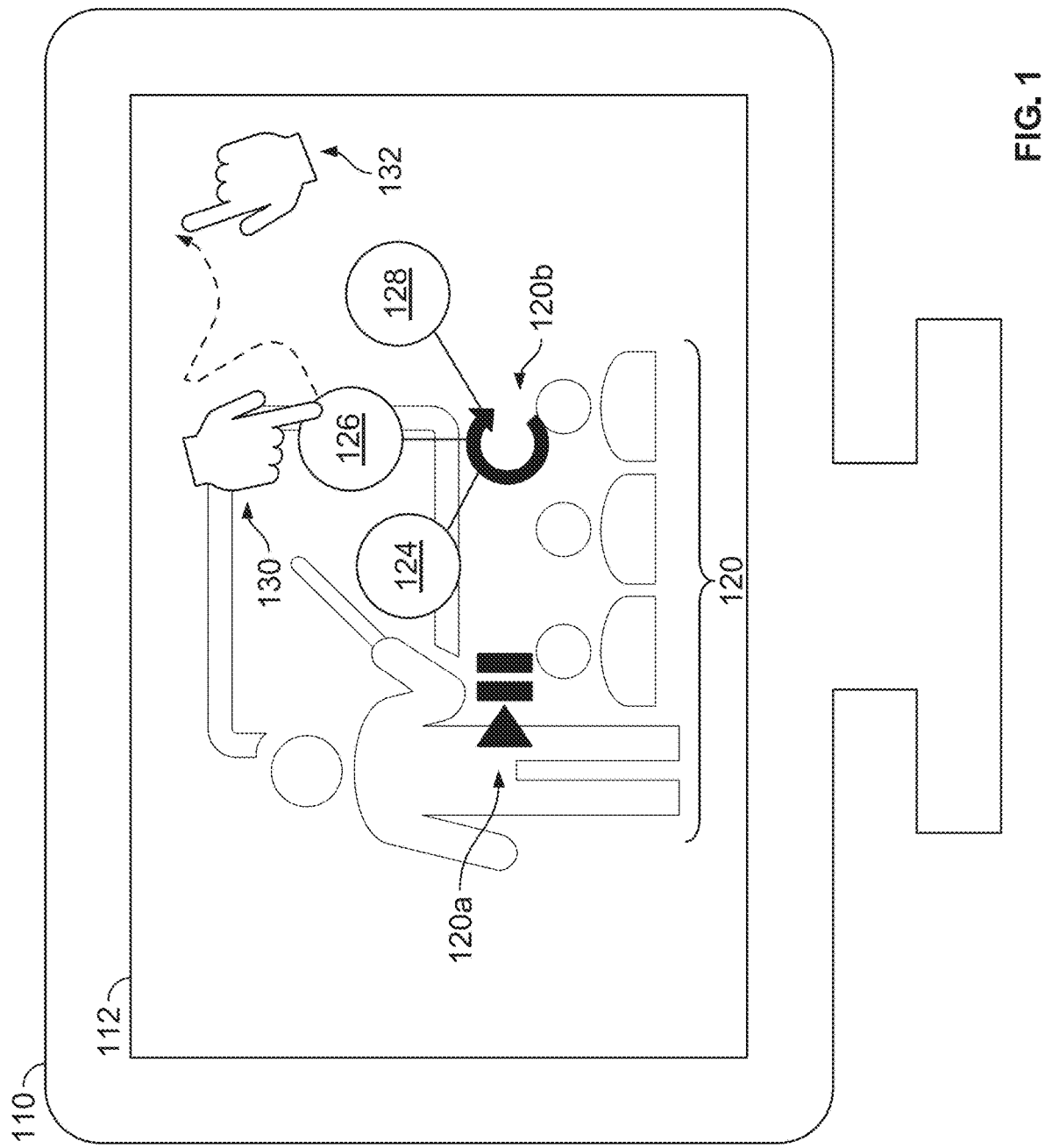
FIG. 1 is an illustrative diagram of a graphical interface for navigating media content, according to some examples of the disclosure.

FIG. 1 is an illustrative diagram of a graphical interface for navigating media content, according to some examples of the disclosure. Shown in FIG. 1 is a content display interface 110, with a media content item 112 being displayed thereon. The content display interface 110 may be considered the user device (e.g., a smartphone, tablet, PC, laptop, or another computing device). In some examples, an input is detected and the selectable indicators 120 may be displayed. For example, the input may be the user clicking or tapping, using the content display interface 110, or an input from a keyboard or other human-computer based interaction (e.g., a hand gesture or voice command). In some examples, the selectable indicators 120 comprise a play/pause selectable indicator 120a and a skip selectable indicator 120b. In other examples, the selectable indicators 120 comprises only a skip selectable indicator 120b. After the skip selectable indicator, 120b has been selected, a plurality of selectable navigation settings 124-128 (e.g., two or more) may be generated. For example, the display of the navigation settings 124-128 may appear overlaid on the content being displayed (e.g., with transparency or not). Each selectable navigation setting 124-128 may comprise a visual representation to assist the user in differentiating between them, such as an alphanumerical character ("–," "+," "S," "M," or "Min," "H," or "Hr," etc.). Each navigation setting is associated with a navigation interval. A navigation interval represents a portion of the content in which the content navigation system will allow the user to navigate. The navigation interval is applied to a current play position of the media content item. In addition, the navigation intervals associated with the plurality of navigation settings 124-128 are set to be different from one another, such that the corresponding navigation intervals are different. Typically, one of the navigation intervals associated with the selectable navigation settings 124-128 is in minutes and another in seconds. In some examples, wherein the media content item is longer than one hour, an additional navigation setting in hours is displayed. In this way, the user can select navigation setting 124-128 to navigate an interval span from a few seconds, minutes, or hours after (and/or before) the current play position (e.g., 5 seconds, 5 minutes, or 1 hour). The user is thus given, by the content navigation system, a plurality of options that allow him or her to adapt the navigation process to their need, with no risk to navigate to an unwanted portion of the content.

As illustrated in FIG. 1, the content navigation system then receives an input 130, from the user, which indicates a selection of one of the selectable navigation settings 124-128 (e.g., navigation setting 126). For instance, the input 130 may be the user clicking or tapping on one of the selectable navigation settings 120a, 120b, which are displayed on the content display interface 110. In some examples, to assist the user in making their choice, the navigation interval may be represented on the content display interface 110 after reception of the input 130 (in that case only the navigation interval of the selected navigation setting is represented) or after reception of the input 132 (in that case the navigation intervals of all the selectable navigation settings are represented). After reception of the input 130, the non-selected navigation setting(s) may no longer be displayed or they might remain on the content display interface in case the user changes his or her mind, or all the navigation settings may no longer be displayed.

The content navigation system further receives an input 132 relative to the navigation interval within the content display interface 110. For instance, the input 132 may be the user dragging his or her finger on the content display interface 110 from one place to another, thereby defining a physical path (e.g., physically touching the content display interface, moving or sliding the finger while keeping contact, and releasing the finger from the content display interface). The navigation amount may be the length of the path as shown in FIG. 1, which may be two-dimensional, or the length of a one-dimensional resultant projection of that path, such as a projection tip to tail, orthogonal or parallel to a preview window (not shown). Visual markers, discussed in more detail below, may be provided to assist the user in determining how much navigation amount is desired. In some examples, the input indicating the navigation interval further comprises detecting a physical touch, dragging, the direction of dragging, and release of the selected navigation setting across a display.

Finally, the content navigation system navigates from a current play position to a shifted play position based on the navigation amount. A scaling parameter may be used to convert the navigation interval drawn by the path into a navigation amount time, the navigation amount time being the amount of content between the current play position and the shifted play position.

Figure 2:
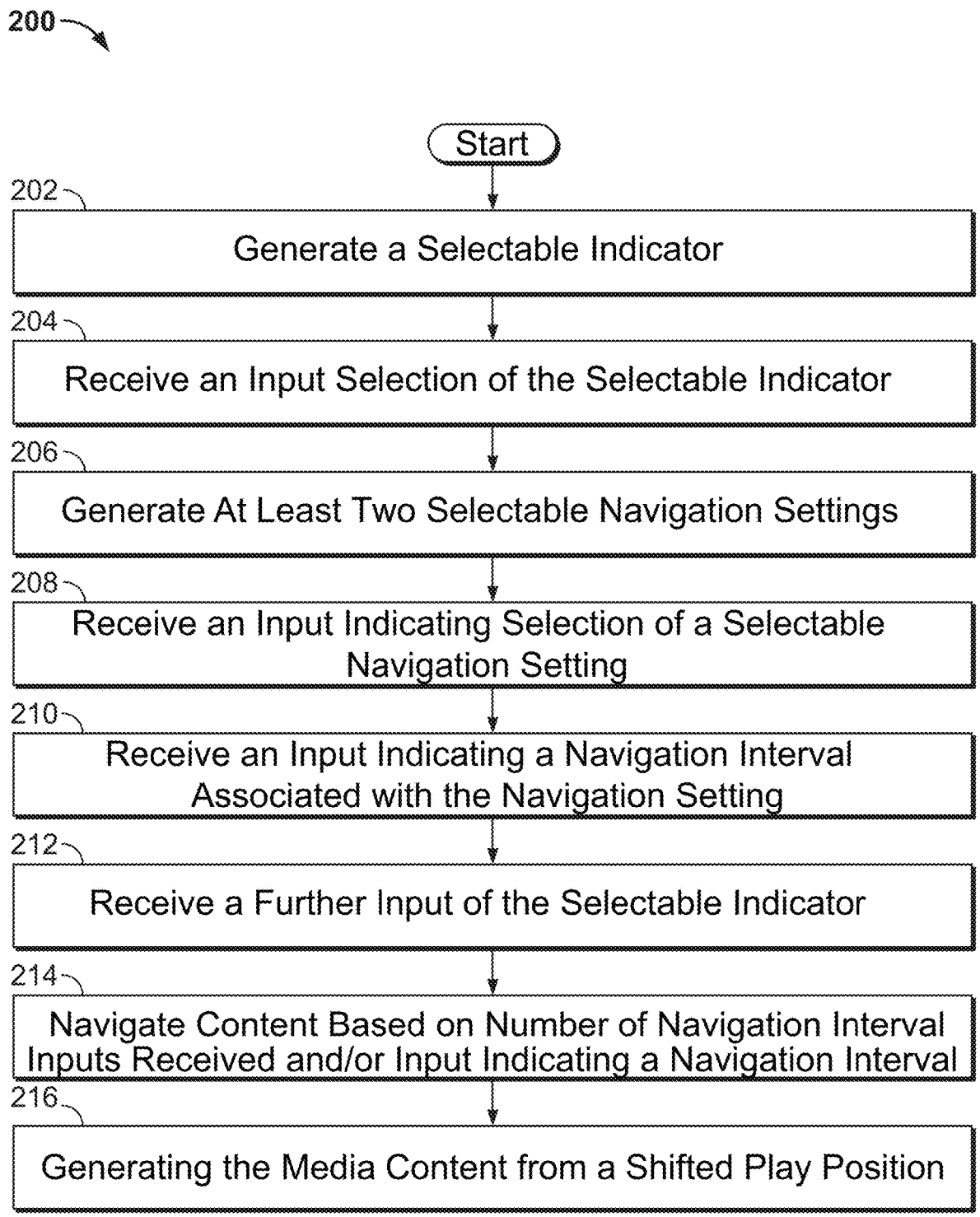
FIG. 2 is an illustrative flowchart of a process for navigating media content, according to some examples of the disclosure.

FIG. 2 is an illustrative flowchart of a process for navigating content, in accordance with some embodiments of the disclosure. Process 200, and any of the following processes, may be executed by any of control circuitry 304 or 322 or any combination thereof, using the communication network 318, as is described in more detail below with reference to FIG. 3.

Process 200 starts at step 202. At step 202, a selectable indicator is generated. For example, a media content item and a selectable indicator for incrementally skipping through the media content item are generated for display on a user device. At step 204, an input selection of the selectable navigation setting is received. For example, an input indicating a selection of the selectable indicator is received as a user interacts with the user device. In some examples, the user device may be a touch-enabled device, and the input selection may be an interaction, for example, a tap, from the user on the selectable indicator with their finger or a stylus. In some examples, the user device may have a peripheral input device such as a keyboard or mouse, and the input selection may be an interaction, for example, a click with the mouse or button press on the keyboard. Alternatively, there might be a dedicated navigation button available on the content display interface. In some examples, control circuitry 304 pauses the content upon detection of the input at step 204. In some examples, control circuitry 304 keeps on playing the content on display 312.

At step 206, at least two selectable navigation settings are generated. In some examples, each navigation setting differs by an order of magnitude. The order of magnitude may be denominations of time, for instance, seconds and minutes; seconds, minutes and hours; minutes and hours; or seconds and hours. In some examples, each navigation setting may be one of seconds, minutes, and/or hours, and each navigation setting is a different denomination of time. In some examples, the navigation settings may be the same denomination of time (e.g., seconds) but separated by at least one order of magnitude. For example, each navigation setting may be different powers of 10, such as 10s of seconds, 100s of seconds, or 1000s of seconds. In some examples, the two or more navigation settings may be overlaid on the content, by a display.

At step 208, an input indicating a selection of the navigation settings is received. For example, after the input selection of the selectable indicator, two navigation settings (e.g., one in seconds, one in minutes) may be generated and displayed to the user. The user can select the navigation setting that is most appropriate for the media content item they are currently viewing.

At step 210, an input indicating a navigation interval associated with the navigation setting is received. In some examples, the navigation interval represents how much the user wants to navigate through the media content item. The navigation interval may be determined using a path on the content display interface, such as a finger being dragged while in contact. Further detail about the paths and user interaction will be given below.

At step 212, a further input of the selectable indicator is received. For example, a navigation setting of seconds may be selected and a navigation interval of 5 seconds input by the user. The user may then select the selectable indicator a further three times, indicating that they want to skip the media content item by 5 seconds three times, totaling 15 seconds.

At step 214, the media content item is navigated based on the number of further inputs of the selectable indicator are received at step 212. In this way, the media content item is navigated from a current play position to a shifted play position. The shifted play position is located at a time away from the current play position equal to, or equal to a multiple of, the navigation interval. In some examples, wherein a number of further inputs of the selectable indicator are received, a scaling parameter is utilized. The scaling parameter translates the navigation interval to an amount of time. The navigating from the current play position to the shifted play position is further based on the scaling parameter. For example, a navigation setting of seconds may be selected and a navigation interval of 5 seconds selected by the user. The user may select the selectable indicator a further three times, therefore a scaling parameter of three times 5 seconds is added to the navigation interval, and the current play position is forwarded to a shifted play position 15 seconds in time. However, the scaling parameter may also take into consideration the frequency of the received further inputs. For example, if the user selects the selectable indicator a further five times, at a high frequency, the scaling parameter may add an additional input, totaling six times the navigation interval. At 216, process 200 generates the media content item from the shifted play position.

In some examples, the current play position may be the play position at the time of the input to perform the content navigation operation (step 204), at the time of generating for display the selectable navigation settings (step 206), at the time of input indicating a selection of the navigation settings (step 208), at the time of input indicating the navigation interval associated with the navigational settings (step 210), or even at the time pertaining to the further inputs of the selectable indicator. This depends on whether the content was paused or not at steps 204, 206, 208, 210, 212, or 214. In practice, it would take only a few seconds from step 202 to step 212 such that which current play position is used has no significant impact, in particular for larger media content item, such as lectures or movies. In some examples, the navigation interval may be dynamically computed such that any change in the current play position impacts the navigation interval input by the user.

Figure 3:
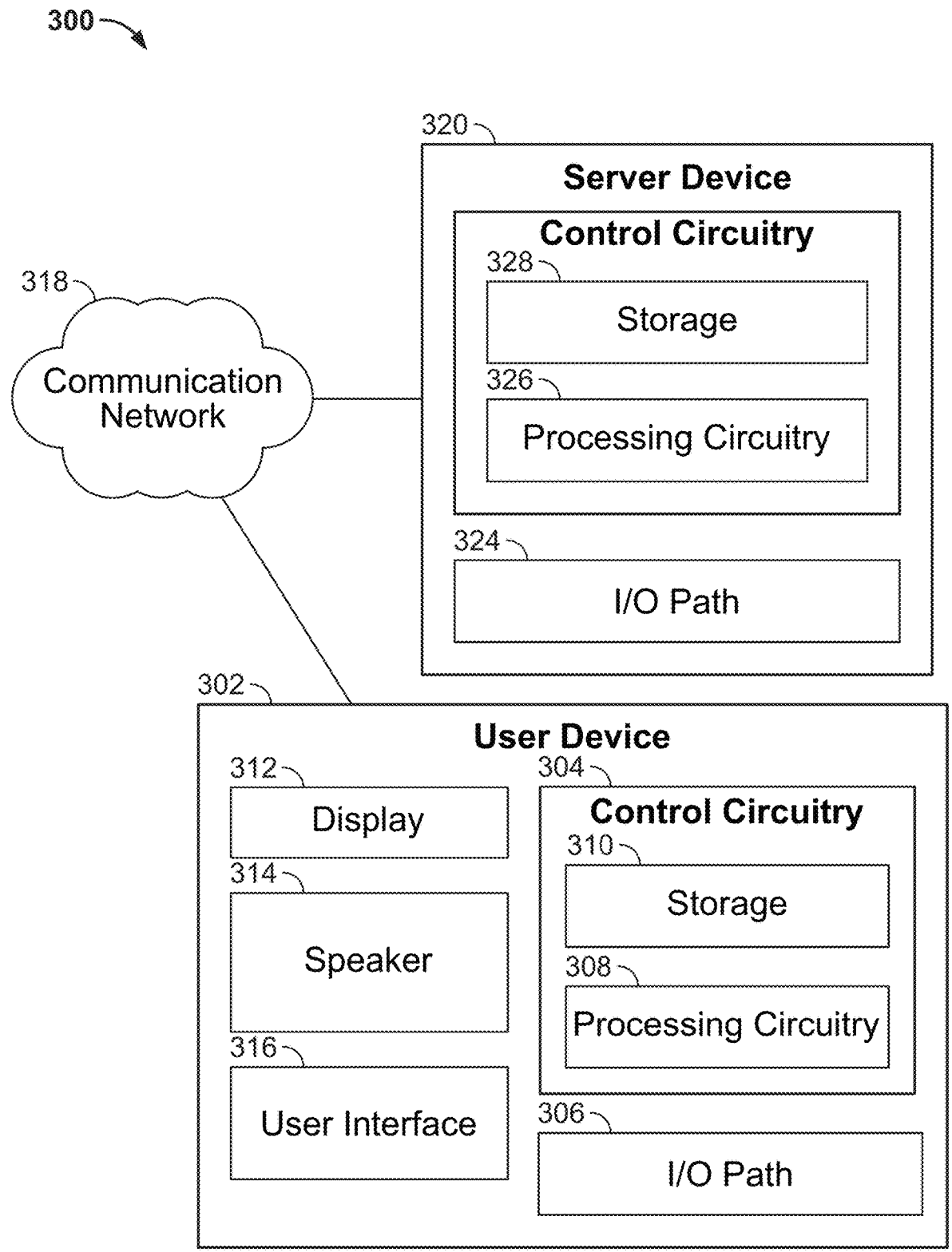
FIG. 3 is an illustrative topology of equipment (or computing configuration) programmed and configured for navigating media content, according to some examples of the disclosure.

FIG. 3 shows an illustrative block diagram of a computing configuration 300 that may include the content navigation system disclosed in relation to FIGS. 1 and 2. Computing configuration 300 includes a user device 302. In some embodiments, the user device 302 may include control circuitry 304 and an input/output (I/O) path 306. Control circuitry 304 may include processing circuitry 308, and storage 310 (e.g., RAM, ROM, hard disk, a removable disk, etc.). I/O path 306 may provide device information, or other data, over a local area network (LAN) or wide area network (WAN), and/or other content and data to control circuitry 304. Control circuitry 304 may be used to send and receive commands, requests, signals (digital and analog), and other suitable data using I/O path 306. I/O path 306 may connect control circuitry 304 (and specifically processing circuitry 308) to one or more communications paths.

User device 302 may include a display 312 and a speaker 314 to display content visually and audibly. In addition, to interact with a user, user device 302 includes a user interface 316 (which may be used in relation to the content display interface 110 disclosed herein). The user interface 316 may include a touchscreen, mouse, and/or keyboard. The user interface 316 is connected to the I/O path 306 and the control circuitry 304. In an embodiment, the user interface 316 and the display 312 may be a touchscreen enabling the user to provide input(s) to the user device. The display 312 may a screen (such as a monitor or a TV).

Control circuitry 304 may be based on any suitable processing circuitry such as processing circuitry 308. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

A memory may be an electronic storage device provided as storage 310, which is part of control circuitry 304. Storage 310 may store instructions that, when executed by processing circuitry 308, perform the processes described herein. As referred to herein, the phrase "electronic storage device" or "storage device" should be understood to mean any device for storing electronic data, computer software, or firmware, such as random-access memory, read-only memory, hard drives, solid-state devices, quantum storage devices, or any other suitable fixed or removable storage devices, and/or any combination of the same. Nonvolatile memory may also be used (e.g., to launch a boot-up routine and other instructions). The user device 302 may be a smartphone, a tablet, an e-reader, a laptop, a smart TV, etc.

Computing configuration 300 may also include a communication network 318 and a server device 320. The user device 302 may be coupled to the communication network 318 to communicate with the server device 320. The communication network 318 may be one or more networks including the Internet, a mobile phone network, mobile voice or data network (e.g., a 5G, 4G, or LTE network), mesh network, peer-to-peer network, cable network, or other types of communication network or combinations of communication networks.

In some embodiments, server device 320 may include control circuitry 322 and an input/output (I/O) path 324. Control circuitry 304 may include processing circuitry 326, and storage 328, which may similar to those already discussed in relation to the user device 302. Server device 320 may be a content provider for the user device 302, such as streaming, VOD, replay platform, etc.

In some embodiments, the content navigation system comprises the user device 302, whether the content is being streamed from the server or being retrieved from the storage 310. Alternatively, the content navigation system is distributed over the user device 302 and the server device 320.

FIGS. 4A, 4B, 4C, 4D, 4E, and 4F illustrate different seekbars of the media content item and how the navigation intervals may be computed. In an example illustrated in FIG. 4A, the navigation interval 408a is defined as the area between the current play position 402 (left boundary of the navigation interval on the seekbar 400) and a forward-shifted play position 404a (right boundary of the navigation interval on the seekbar 400). In this case, the illustration only shows forward navigation.

In an example illustrated in FIG. 4B, the navigation interval 408b is defined as the area between the current play position 402 and the backward-shifted play position 406b (left boundary of the navigation interval on the seekbar 400). In this case, the illustration only shows backward navigation.

In an example illustrated in FIG. 4C, the navigation interval 408c is defined as the area between the backward-shifted play position 406c (left boundary of the navigation interval on the seekbar 400) and a forward-shifted play position 404c (right boundary of the navigation interval on the seekbar 400). In this case, the navigation system shows backward and forward navigation. The navigation interval 408c is, in that implementation, centered on the current play position 402. That a navigation interval is for forward navigation, backward navigation, or both (irrespective of the navigation interval) may vary between the selectable navigation settings displayed at step 206 (FIG. 2), such that one selectable navigation setting may be used to navigate forward only and another one backward only. In some examples, the path drawn by input 132 may have a forward (e.g., substantially right) and backward (e.g., substantially left) portion, and therefore a forward and backward play position may be shown to the user, so the user can choose which direction they intended. In some examples, the user can select between a forward- and backward-shifted play position to generate, and ultimately consume, the media content item. In some examples, the absolute length of the path, i.e., irrespective of direction, is used to determine a navigation interval. In an example illustrated in FIG. 4D, the navigation interval 408d is defined as the area between the backward-shifted play position 406d (left boundary of the navigation interval on the seekbar 400) and a forward-shifted play position 404d (right boundary of the navigation interval on the seekbar 400). In this case, the navigation system shows backward and forward navigation. The navigation interval 408d is, in that implementation, not centered on the current play position 402. In some examples, the path drawn by input 132 may have a forward portion (e.g., substantially right or in any other suitable first direction) and a backward portion (e.g., substantially left, or in any other suitable direction substantially opposite to the first direction), and therefore a forward and backward play position may be shown to the user based on the proportion of forward and backward gestures, so the user can choose which direction they intended. For example, a user may begin dragging the selectable navigation setting 126 towards the right (e.g., for forward) but then changes their mind and then begins dragging the selectable navigation setting 126 towards the left (e.g., for backward). The user is then presented with both options for further selection. All these possibilities for the navigation settings allow the navigation content system to be more adaptable. The disclosed embodiments can be combined among the plurality of navigation settings.

In an example illustrated in FIG. 4E, the navigation interval 408e is defined as the area between the current play position 402 (left boundary of the navigation interval on the seekbar 400, representing a first media content item) and a forward-shifted play position 404e (right boundary of the navigation interval on the seekbar 400e, representing a second media content item). However, in this case, the illustration shows that the forward-shifted play position 404e is located on a second media content item. Accordingly, the navigation interval 408e spans two media content items. In an example illustrated in FIG. 4F, the navigation interval 408f is defined as the area between the current play position 402 (left boundary of the navigation interval on the seekbar 400, representing a first media content item) and a forward-shifted play position 404f (right boundary of the navigation interval on the seekbar 400f, representing a third media content item). However, in this case, the illustration shows that the forward-shifted play position 404e is located on a third media content item. Accordingly, the navigation interval 408f spans three media content items. In both of the examples illustrated in FIGS. 4E and 4F, it is shown that a shifted play position can span multiple media content items, and a person skilled in the art would recognize that the examples given of two and three media content item are non-limiting. However, in practice, it is not likely that a user would wish to skip more than one or two intermediary media content items, not without reviewing. However, in some examples, the user may wish to skip to a known media content item in a playlist of media content items, therefore the navigation settings 124-128 may comprise a number of media content items to navigation, rather than a denomination of time.

In some examples, wherein the media content item comprises a playlist of a plurality of media content items to be consumed, the navigation settings 124-128 may comprise an option to skip whole media content items in the playlist. For example, considering FIG. 4F, the user may currently be watching a first media content item, represented by seekbar 400, at current play position 402. The user can select selectable indicators 120, and choose a navigation setting 124-128 that represents a number of media content items to skip. After selecting the relevant navigation setting, the user can input a navigation interval that corresponds to a number of whole media content items to skip, for example, the user can skip one media content item to arrive at a third media content item. In some examples, when the user selects this option, the system can start the third media content item at the beginning, or at the shifted play position 404f.

In some examples, the original play position 402 may act as a marker that the user can use to revert to after advancing to a first or second shifted play position 404, 406. For example, if the user has input a navigation interval that takes them to a first shifted play position 404, the system will save the current play position with a timestamp, such that on a second input and selection of the navigation settings 124-128, the user can select to revert to the 'previous' current play position. I.e., the play position prior to the skip.

In some examples, after the user has selected a navigation setting 124-128 and input a navigation interval (e.g., 7 minutes) then that value is assigned to the "skip" function which can be invoked by the user selecting the selectable indicator 120 or by swiping or tapping, as described in more detail below. In some examples, the value assigned to the skip function does not remain constant. For instance, as the media content item is consumed, the system (e.g., a media content player) may update the input navigation interval based on how much of the media content item has been consumed. Therefore, in some examples, when a previously input navigation interval exceeds the length of the media content item, the system updates the navigation interval. The system may update the navigation interval by selecting a different scaling parameter to convert the navigation interval into a shorter amount of time to be navigated. In some examples, the updated navigation interval (e.g., the amount of time to be skipped) is displayed when the user wishes to perform the skip function again.

It should also be understood that the features described with reference to FIGS. 4A-4D, may also be combined with the features described with reference to FIGS. 4E and 4F and, for the avoidance of doubt, vice versa.

Figure 5A:
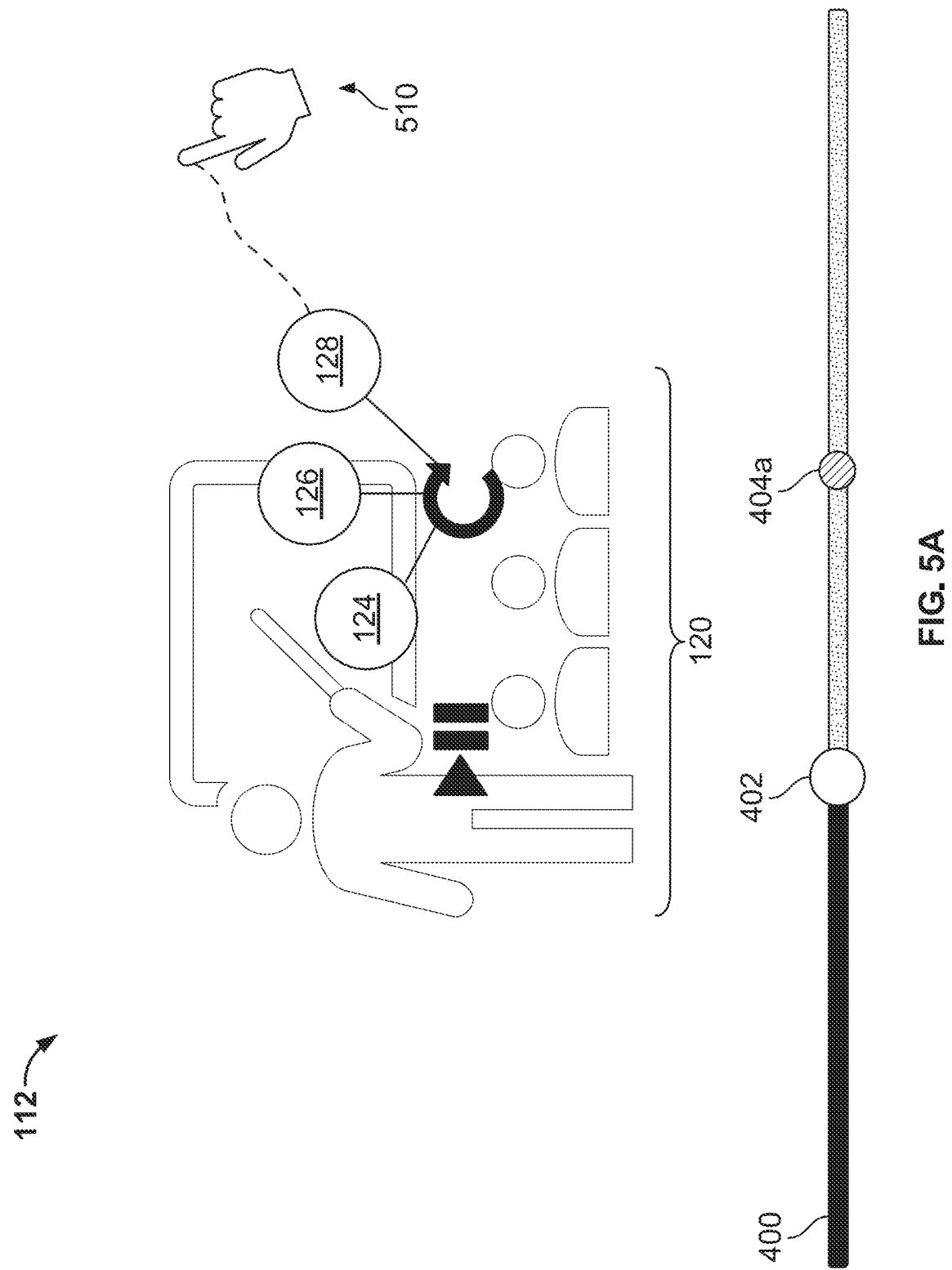

FIGS. 5A, 5B, 5C, 5D, and 5E illustrate different configurations for the navigation settings to be generated, according to some examples of the disclosure. These illustrations are made using a seekbar 400 such as that shown in FIGS. 4A and 4C, and the content navigation system of FIG. 1. FIG. 5A illustrates a first example of a user's input 510 drawing a path. In this example, the selectable indicator 120 and the navigation setting 128 have already been selected. As shown, the user is drawing a path with input 510 that is substantially right, indicating that they want to skip the media content item forward. The seekbar 400 shows a current play position 402 and a shifted play position 404a. The navigation interval (not shown), in this example, is the area between the current play position 402 and the shifted play position 404a. The display of any example shown here may also further comprise an interval marker representing the navigation interval, a preview window representing the content at the shifted play position, an elapsed time indication of the shifted play position, and temporal markers indicating positions within the content represented by the seekbar.

Figure 5B:
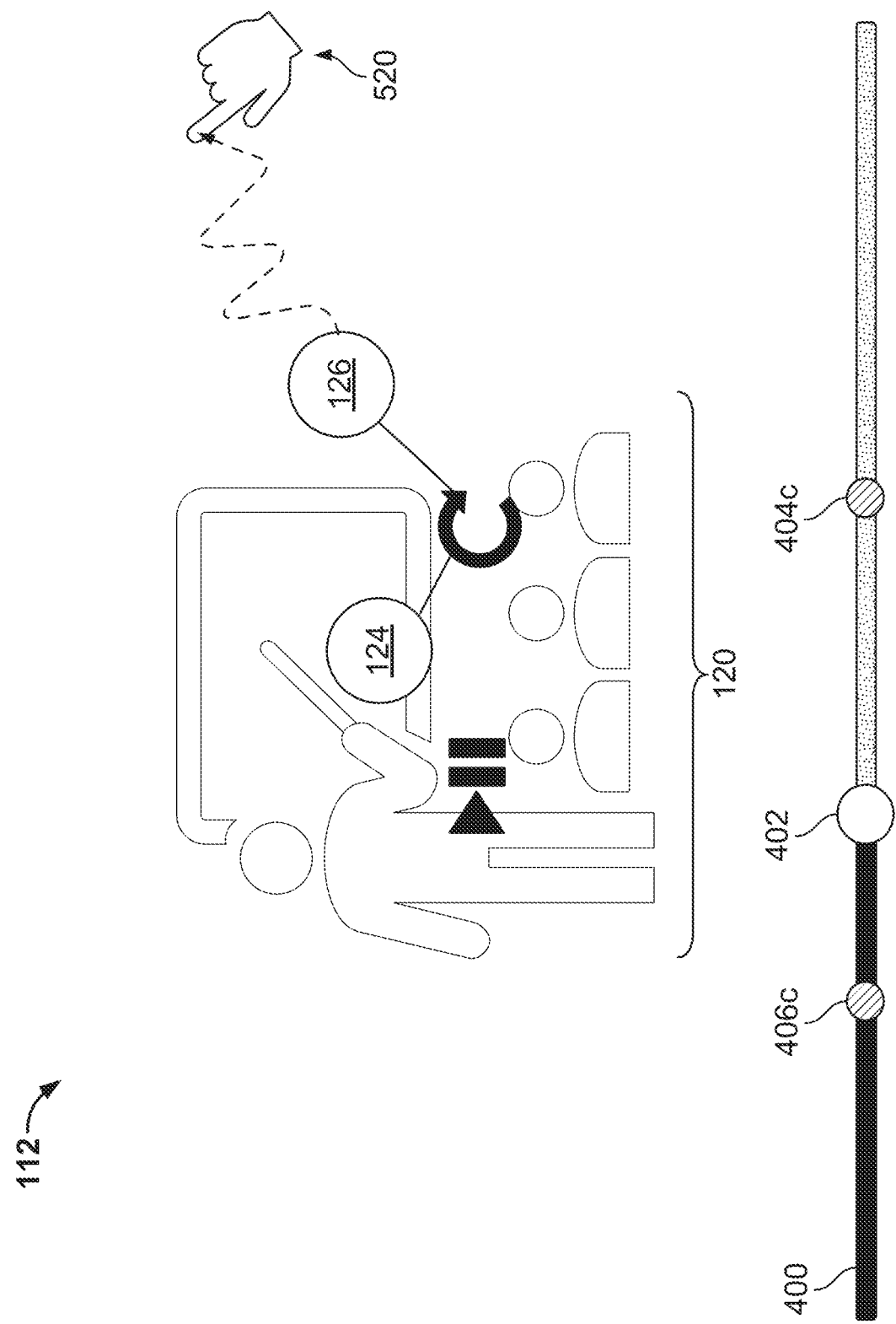

FIG. 5B illustrates a second example of a user's input 520. In this example, the selectable indicator 120 and the navigation setting 126 have already been selected. As shown, the user is drawing a path with input 520. Input 520 has two different directions, one that is substantially upwards and another that is substantially downwards. In this example, the system will provide a first shifted play position 404c and a second shifted play position 406c the user can select. In these examples, the navigation interval is defined as the area between the first shifted play position 404c and the current play position 402. In this example, the navigation interval is also the same as the area between the current play position 402 and the second shifted play position 406c. The navigation interval may be an absolute distance drawing by the input 520 or may be a tip-to-tail resultant distance, as was described above.

FIG. 5C illustrates a third example of a user's input 530. In this example, the selectable indicators 120 have been selected and an alternate display of the navigation settings 124-128 and 544-548 are displayed. In some examples, navigation settings 124-128 may represent forward skips of the media, at different orders of magnitude or different denominations of time, for example, seconds, minutes, and hours respectively. In some examples, navigation settings 544-548 may represent backward skips of the media content item, at different orders of magnitude or different denominations of time, for example, seconds, minutes, and hours respectively. In some examples, the user's input 530 is a plurality of inputs, such as a series of tapping, as shown in FIG. 5C. In some examples, the number of further inputs 530 represents the number of times that the navigation interval is to be applied to the current play position 402 to determine the shifted play position 404a. In some examples, the point of contact of each of the plurality of inputs may not be on the navigation setting 126. In some examples, the first input of the plurality of inputs is on the selectable navigation setting 126, and a plurality of subsequent inputs is within an area 535 of the selectable navigation setting 126, as defined by the area bound by the dashed line in FIG. 5C. As shown, there may be multiple areas defined around each of the plurality of navigation settings 124-128 and 544-548. In these examples, the input 530 is shown without any dragging and release, however, it should be understood that the examples above are not limited to just tapping, as shown. A combination of tapping and dragging is within the scope of the example shown in FIG. 5C.

In some examples, the user may tap forward navigation setting 124-126 to advance the shifted play position 404 and tap backward navigation setting 544-548 to reverse an advance of the shifted play position 404. For example, the user may tap the navigation setting 124 five times, for a total navigation interval of 25 seconds, but then change their mind and tap navigation setting 544 1 time to reverse the advance by 5 seconds, totaling a navigation interval of 20 seconds. In some examples, the user may use the navigation settings 124-128 and 544-548 to navigate to a specific shifted play position 404. For instance, if the user wishes to advance the current play position 402 to a shifted play position 404 that is 4 minutes 30 seconds forward, the user could tap navigation setting 126 one time (e.g., 5 minutes forward skip) and the navigation setting 544 six times (e.g., 30 seconds backward skip) resulting in 4 minutes 30 seconds forward skip. In these examples, the navigation settings 124-128 and 544-548 are associated with a navigation interval preset by the user or the system. However, the user could drag and release the navigation settings 124-128 and 544-548 prior to any of the tap combinations described above to set them to any value they desire or find useful. It should be understood that the example shown in FIG. 5C is non-limiting, and there may be more or fewer navigation settings 124-128 and 544-548 generated for the user to select.

FIG. 5C further illustrates a second distinct shifted play position 504. In some examples, wherein the input 530 is a combination of taps and drags (e.g., paths are drawn by the user's finger), the system will provide a choice between two shifted play positions. In some examples, the first shifted play position 404 is an accumulation of the inputs of the navigation setting in number (e.g., five inputs, three taps and two drags), in this way an accidental user drag when a tap was intended will be mitigated. In another example, the taps before and after a drag will have navigation intervals of different values and therefore represent different amounts of skips at different values. For instance, three taps at the 5-seconds navigation interval, then a drag input indicating an increased navigation interval to 7 seconds, then an additional tap at the 7-seconds navigation interval, totaling 22 seconds of forward skip.

Figure 5D:
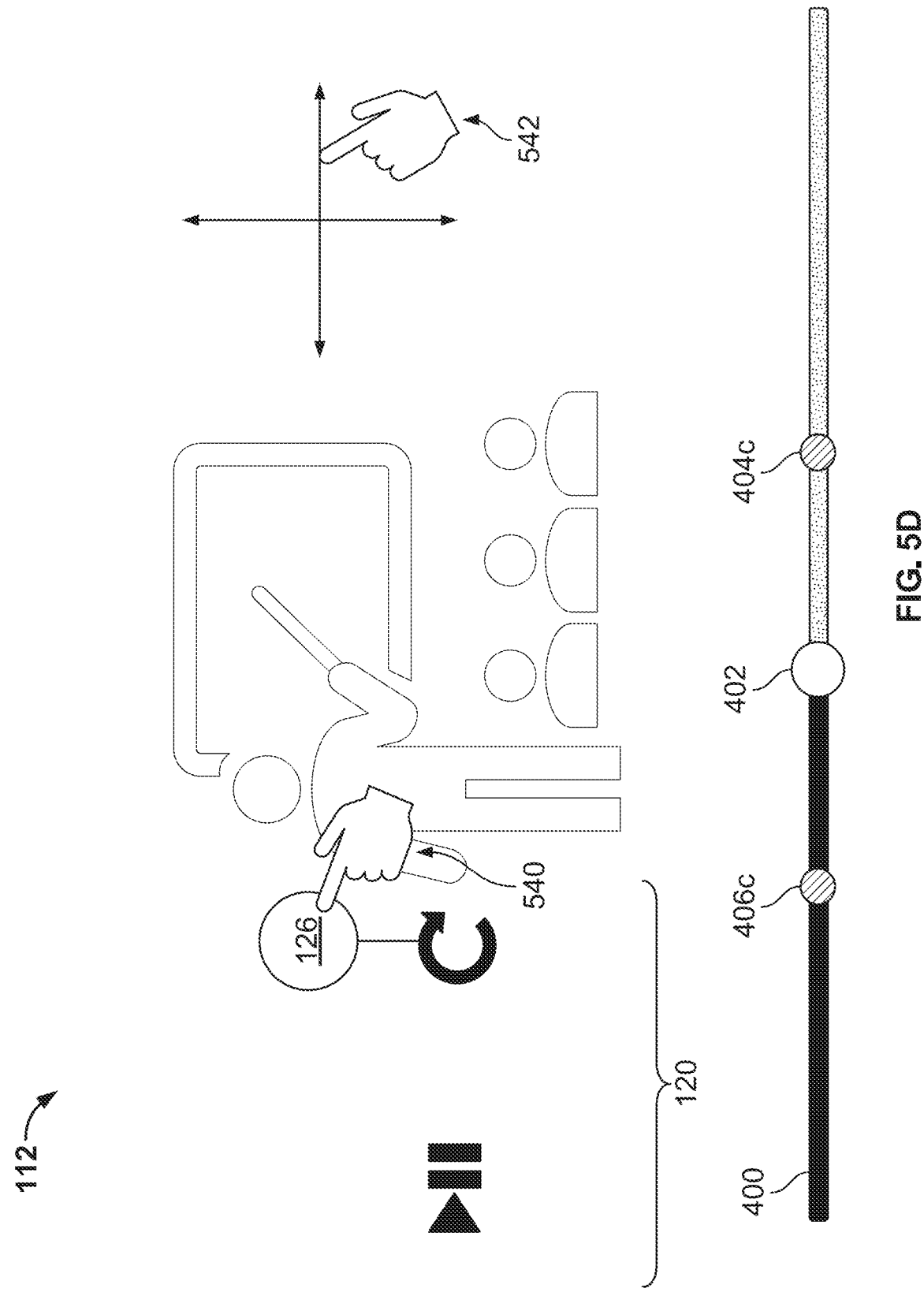

FIG. 5D illustrates a fourth example of a user's inputs 540 and 542. In this example, the selectable indicator 120 has been generated in an area that does not obscure the media content item 112 generated on the display 110 (not shown). As shown, the user's first input 540 selects the navigation setting 126. In response to the selection of the navigation setting 126, the selectable indicator(s) 120 can disappear in their entirety, to avoid obscuring the media content item 112. In some examples, and as shown in FIG. 5D, the user's second input 542 is drawing a path in a separate area to the area in which the selectable indicators 120 were generated. In some examples, the input 542 can be a swipe in a first or second direction, wherein the direction of the input allows the user to set the navigation in seconds or minutes (e.g., up/down indicates minutes forward or backward and left/right indications seconds forward or backward).

In some examples, the initial direction of the input 542 determines whether the navigation interval will be in a forward or backward direction from the current play position 402. In this example, the system will provide a first shifted play position 404c and a second shifted play position 406c that the user can move with the up/down or left/right motion of the input 542. In some examples, the navigation settings 124-128 may comprise forwards or backward direction for the skip, and the second input 542 determines the absolute distance of the navigation interval. In these examples, the navigation interval is defined as the area between the first shifted play position 404c and the current play position 402 (or equally, the area between the second shifted play position 406c and the current play position 402).

In this example, in FIG. 5D, the navigation interval is also the same as the area between the current play position 402 and the second shifted play position 406c. The navigation interval may be an absolute distance drawing by the input 520 or may be a tip-to-tail resultant distance, as was described above.

Figure 5E:
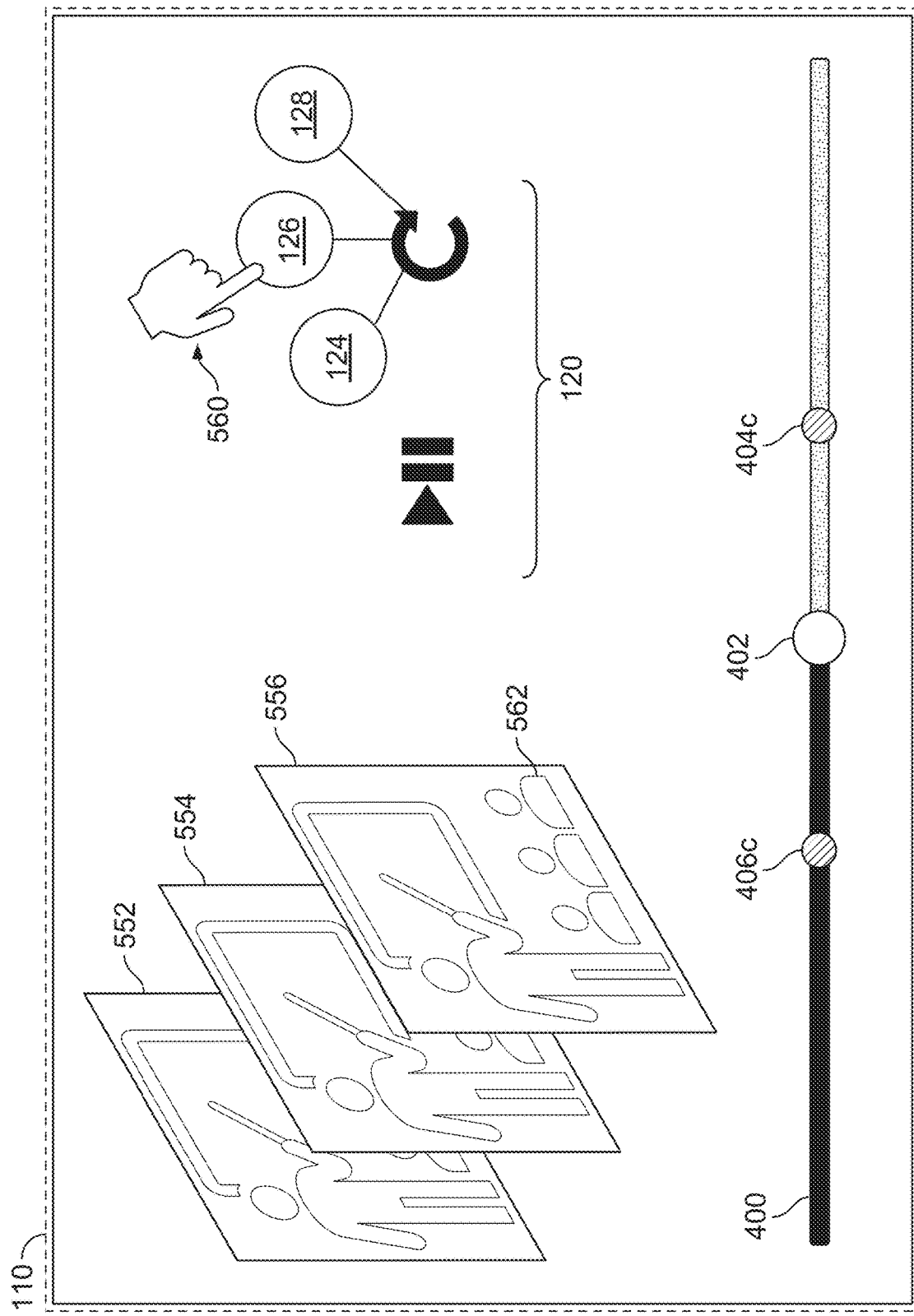

FIG. 5E illustrates a fifth example of a user's input 560. In this example, the selectable indicator 120 and the navigation setting 126 are selected and input as described with regard to any of the previous examples. However, as shown, the user is shown a number of scenes 552-556, to illustrate the current play position 402, a first shifted play position 404c and a second shifted play position 406c, of seekbar 400. In some examples, any one or more of the scenes 552-556 are omitted, or additional scenes are provided; the example shown in FIG. 5E is intended to be a non-limiting example for illustration purposes.

In the illustrative example shown in FIG. 5E, after selecting the selectable indicator 120, and navigation setting 124-128, the user selects a navigation interval with input 560. Input 560 may be any of the various examples of inputs described with reference to FIGS. 5A to 5D. In these examples, the navigation interval may, rather than a time, represent a number of scenes or frames to skip within the media content item. For example, the scaling parameter may be adapted to convert a distance or selection of the navigation interval into a number of scenes or frames to skip within the media content item. In some examples, the first shifted play position 404c corresponds to scene 556, a second shifted play position 406c corresponds to scene 552, and a current play position 402 corresponds to scene 554.

In some examples, when navigating through the media content item, the user may use a system similar to that of FIGS. 5A to 5D; however, if the first shifted play position 404c or the second shifted play position 406c is still within the same scene, the user may wish to automatically shift to the start of the next scene. For example, the user may use the navigation settings 124-128 to quickly input a navigation interval with a short gesture, e.g., a flick of navigation setting 126. The gesture may be preconfigured and known to the user and the system. In some examples, the system can detect an input by the user that indicates to the system the user wishes to navigate to a next scene. For instance, the user may be watching a movie, which is currently at a current play position 402, corresponding to a scene 554. After the user inputs a gesture indicating they wish to skip to a next scene, the system can advance the shifted play position 404c to a next scene 556, irrespective of the navigation interval. In practice, this can be achieved by utilizing a scaling parameter that advances the first shifted position 404c to the next scene; however, other ways are considered to be included in the disclosure.

In some examples, the user may use the navigation settings 124-128 to quickly input a navigation interval with a second short gesture, e.g., a specific movement of the navigation setting 126. The gesture may be preconfigured and known to the user and the system. In some examples, the system can detect an input by the user that indicates to the system the user wishes to navigate to a previous scene. For instance, the user may be watching a movie, which is currently at a current play position 402, corresponding to a scene 554, after the user inputs a second gesture indicating they wish to go back to a previous scene, the system can re-wind the second shifted play position 406c to a next previous scene 552, irrespective of the navigation interval. In practice, this can be achieved by utilizing a scaling parameter that applies a negative coefficient to re-wind the second shifted position 406c to the previous scene 552, however, other ways are considered to be included in the disclosure.

In some examples, the various scenes 552-556 can be generated in a way as shown in FIG. 5E. However, in other examples, scenes 552 and 556 can be generated as picture-in-picture scenes so that the user can view a next scene (or frame) 556 or previous scene (or frame) 552 without obscuring the current media content item 112 being displayed in the current scene 554. For example, the media content item 112 may be a lecture. The user can skip through a next scene 556 until they recognize that a member of the audience 562 has asked a question. In this way, the user can skip ahead scenes (or frames) to a point that looks interesting and watch that scene. Later, the user can revert back to the previous scene 554, as described above.

The examples to determine the navigation intervals may be combined among the plurality of navigation settings. For instance, one navigation setting of the plurality of selectable navigation settings may be associated with a navigation interval as detailed in FIGS. 5A to 5E above, and another navigation setting of the plurality of selectable navigation settings may be associated with a navigation interval as described with references to FIGS. 1 to 4F. For the avoidance of doubt, a combination of the examples of the user's inputs as described with reference to FIGS. 5A to 5E above, are compatible with one another, or any other of the examples described herein, such as those as described with reference to FIGS. 1 to 4F.

Figure 6:
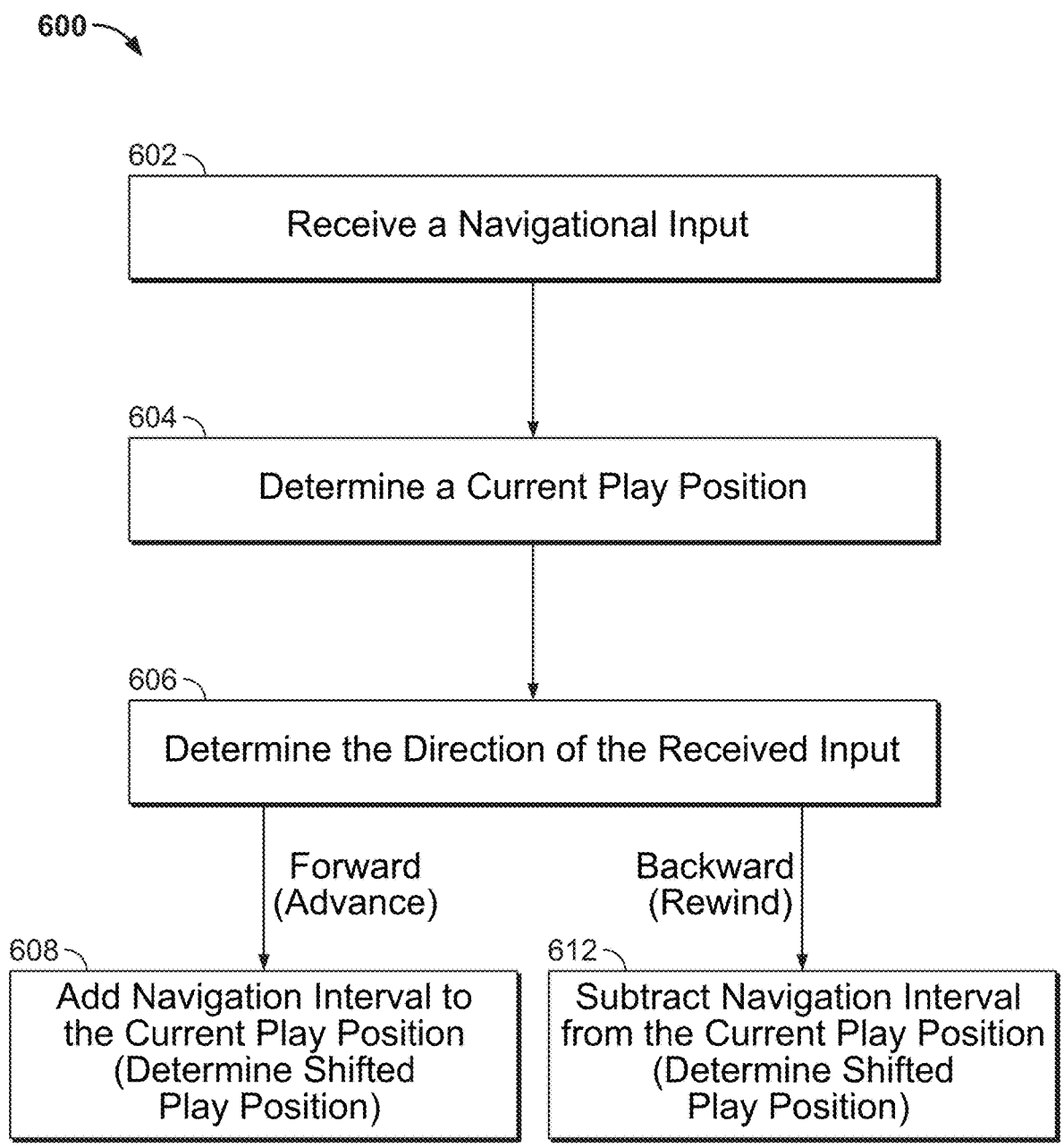
FIG. 6 is an illustrative flowchart of a process for computing the shifted play position, according to some examples of the disclosure.

FIG. 6 is an illustrative flowchart of a process 600 to determine a relative value of the navigation interval, in accordance with some embodiments of the disclosure. Process 600 may be performed during step 208 of receiving an input indicating a selection of a selectable navigation setting or step 210 of receiving an input indicating a navigation interval associated with a navigation setting.

At step 602, a navigational input is received. As mentioned above in some examples, the navigational input is an input indicative of the navigation interval or input indicating a selection of a navigation setting. At step 604, a current play position of the media content item is determined. Steps 602 and 604 can be run in parallel or in any order. At step 606, the direction of the received input at 602 is determined.

At 608, if it is determined that the direction of the received input is for a forward (or advance) skip, the system adds the navigation interval to the current play position to determine a shifted play position. At 612, if it is determined that the direction of the received input is for a backward (or rewind) skip, the system subtracts the navigation interval from the current play position to determine a shifted play position. In some examples, process 600 can be used to determine a direction of the input indicating the navigation interval, wherein adding is associated with a first direction and subtracting is associated with a second direction.

In some examples, to further ease the navigation, control circuitry 304 may utilize a scaling parameter as discussed with reference to FIG. 1. The scaling parameter is a conversion between the navigation interval and the navigation amount time (i.e., the amount of content that is being shifted based on the navigation amount). The scaling parameter may also apply to the length of the path drawn by user input. For instance, assuming that the navigation amount is a distance D, for instance, the length of a path drawn by a finger on the user interface 316, and that the navigation amount time T within the content is proportional to the distance D, then D and T can be expressed as, $T = k \cdot D$, where k is the scaling parameter (only positive numbers are considered in this example, but the same applies to negative numbers for a rewind event). For the same distance D, the higher k is, the higher T is. Each navigation setting may have a different scaling parameter k.

Figure 7:
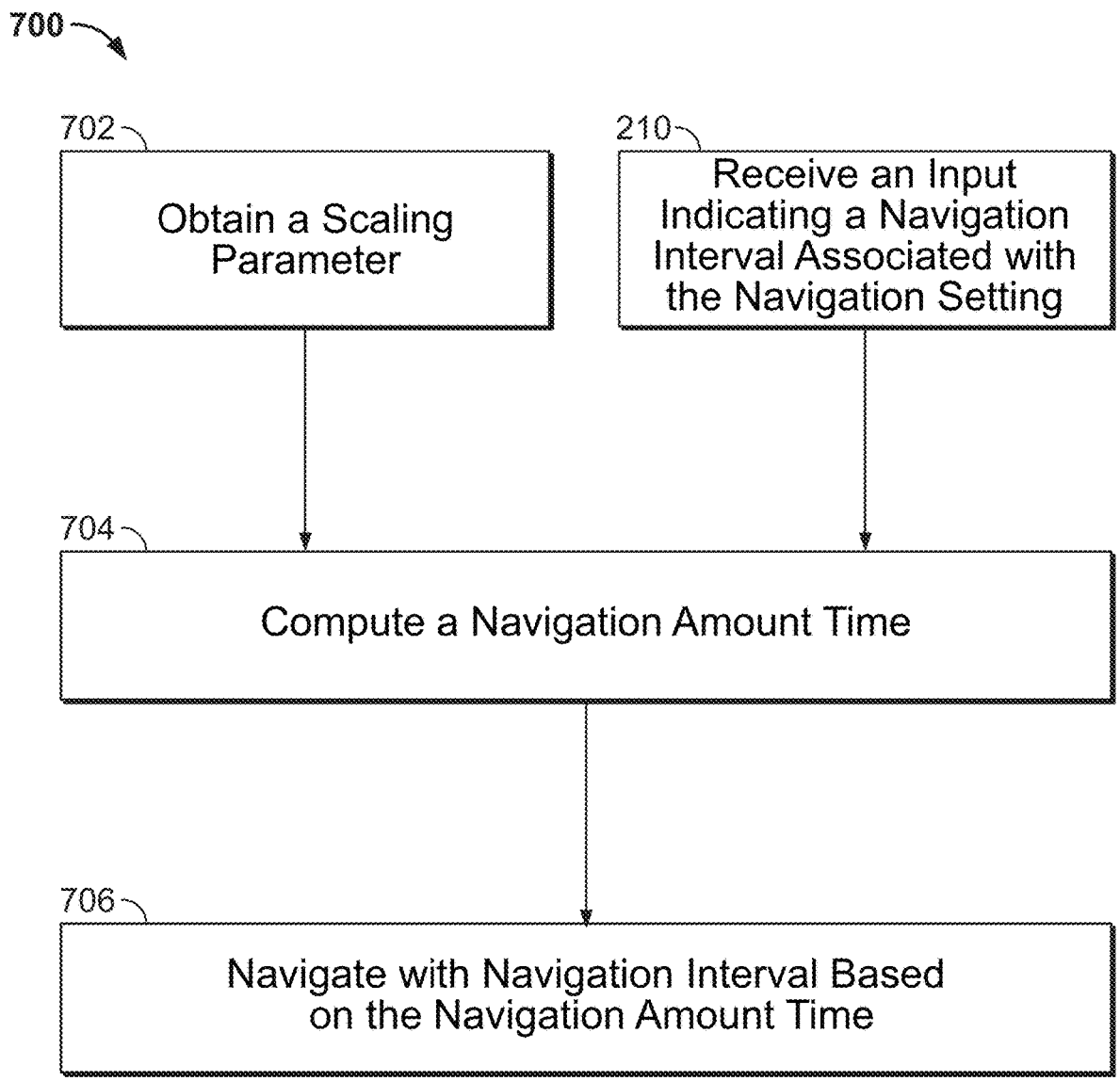
FIG. 7 is an illustrative flowchart of a process for computing a navigation amount time using a scaling parameter, according to some examples of the disclosure.

FIG. 7 is an illustrative flowchart of a process 700 taking into account a scaling parameter. At step 702, a scaling parameter is obtained. Step 702 can be performed anytime between steps 202 and 214 (inclusive). Then, using the navigation interval of step 210, for example, and the scaling parameter, the system computes, at step 704, the navigation amount time. At step 706, the system navigates within the navigation interval based on the navigation amount of time. In an example, the scaling parameter is part of the navigation settings, such that each navigation setting is associated with a navigation interval and a scaling parameter. Therefore, obtaining a scaling parameter 702 may be based on the selection of the navigation settings, at 208.

To improve the navigation, the scaling parameters of the plurality of navigation settings are different from one another and are chosen to be relevant for the navigation interval of their respective navigation setting. For instance, a navigation setting associated with a navigation interval of 1 minute may need a small scaling parameter, so that the user can finely adjust the shifted position using a substantial portion of the content display interface. Conversely, a navigation setting associated with a navigation interval of 2 hours may need a high scaling parameter, so that the user may easily adjust the shifted position using the same substantial portion of the content display interface.

To get the most appropriate scaling parameter, control circuitry 304 may compute the scaling parameter as follows: span of the navigation interval divided by a dimension of the content display interface (e.g., the height, the width, or the diagonal of the display of the user device). In addition, control circuitry 304 may display, on the content display interface, an option for the user to voluntarily change the scaling parameter. Upon input from a user, control circuitry 304 may then compute the navigation amount time using the voluntarily changed scaling parameter.

Figure 8:
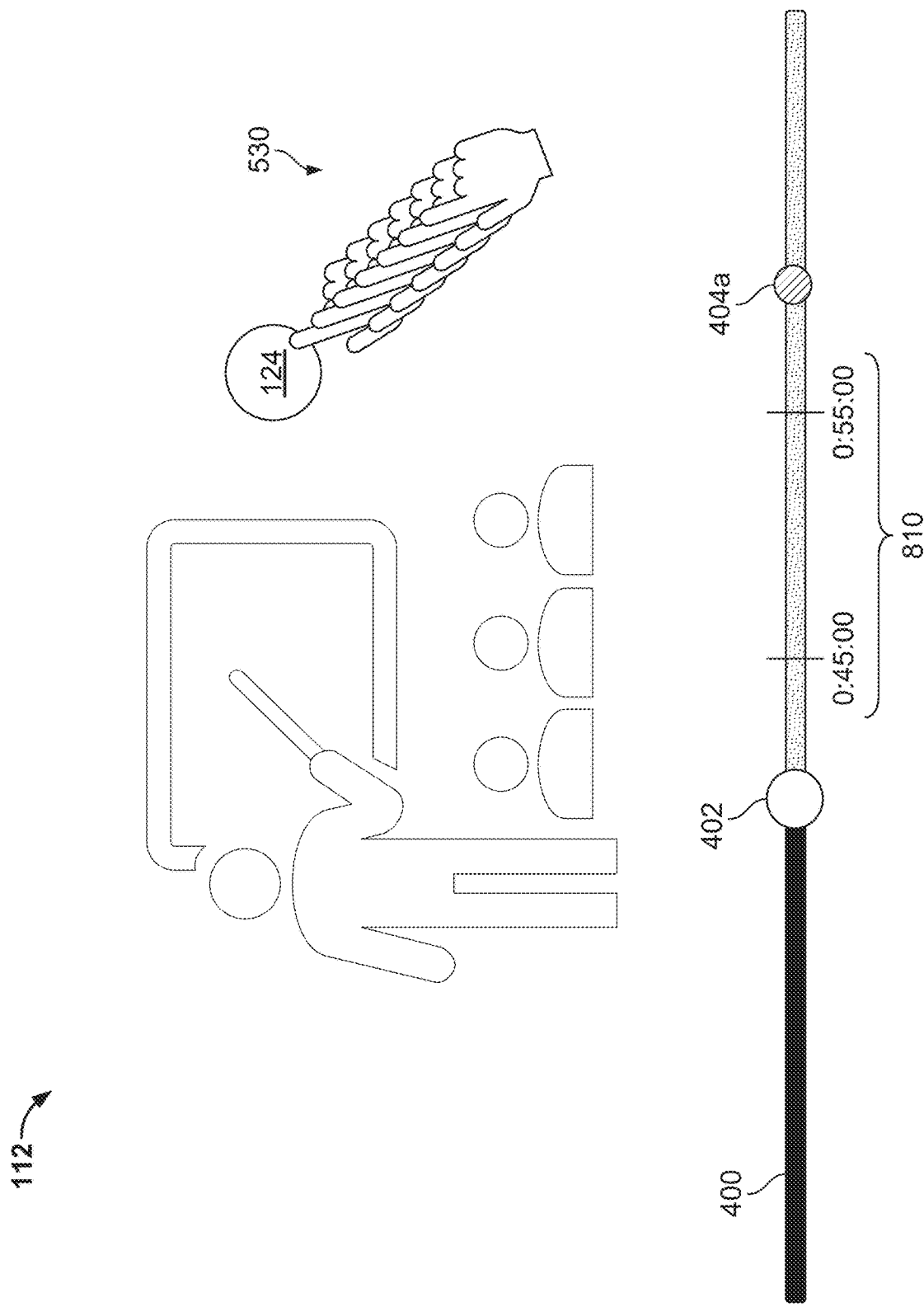
FIG. 8 is an illustrative diagram of how visual markers may be used to represent a distance of the shifted play position from the current play position, according to some examples of the disclosure.
Figure 9:
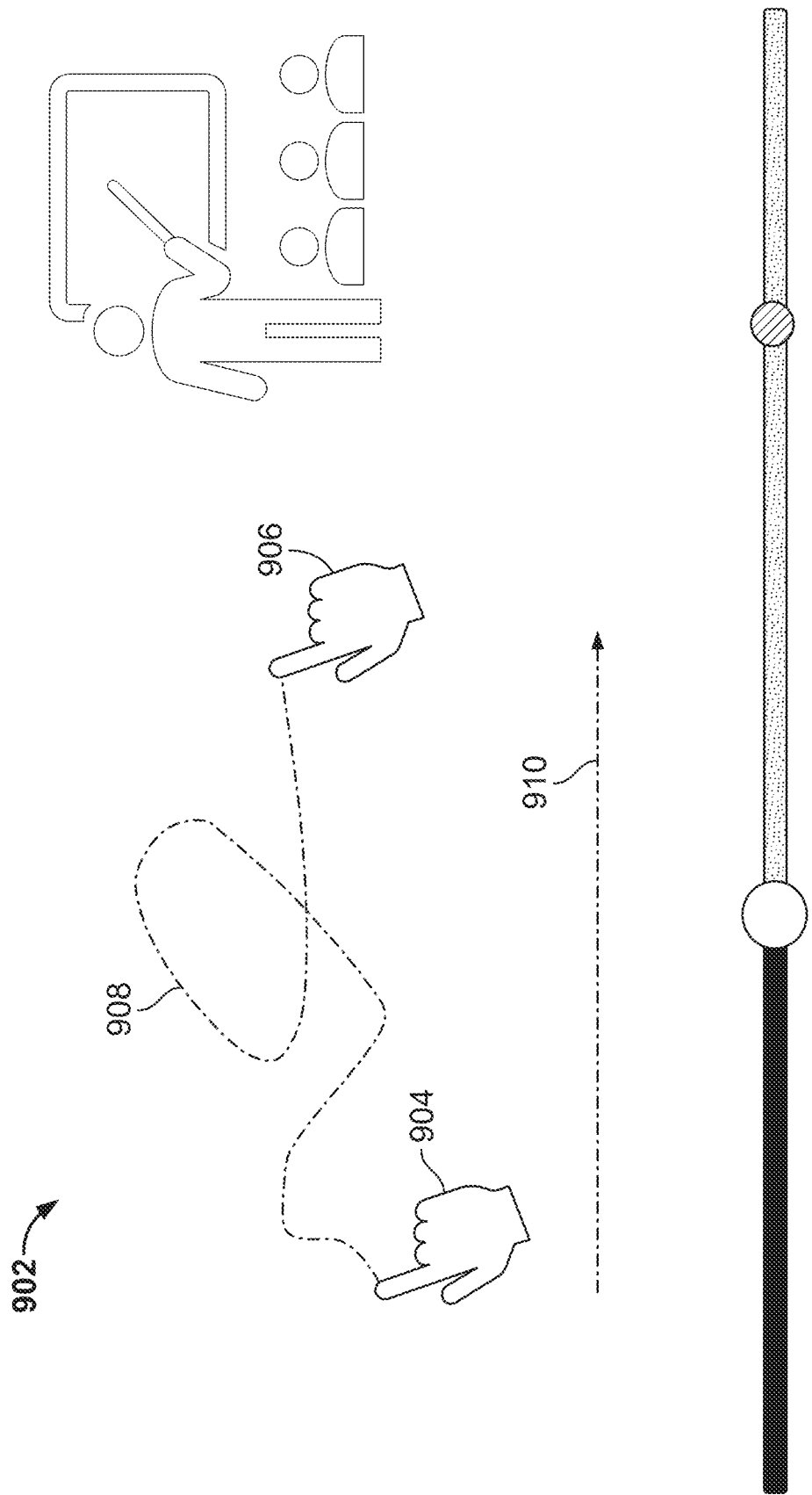
FIG. 9 is an illustrative diagram of a user's input path on a graphical interface, according to some examples of the disclosure.

FIG. 8 is an illustrative diagram of how visual markers may be used to represent a distance of the shifted play position from the current play position, according to some examples of the disclosure. A visual marker may represent time markers in the media content item. The system, for example, control circuitry 304, may generate for display a visual marker at the same time it generates for display the selectable navigation settings. In some examples, a visual marker may include temporal markers representing different temporal positions 810 within the content (or more specifically within the navigation interval) represented by the seekbar 400. The time indications 810 may mark every 10s, 30s, 1 min, 5 min, 15 min, 30 min, or 1 hour, for instance (or any other value at regular intervals). The temporal positions 810 may appear during the input of the navigation amount or at the same time as the generation for display of the navigation settings, at step 206.

As illustrated in FIGS. 1, 5A, 5B, and FIG. 9, the navigation amount may comprise a path within the content display interface. The navigation interval is typically determined using a path on the content display interface, via the user interface 110. For instance, in FIG. 9, a path 902 starts with the detection of a physical touching 904 of the content display interface and terminates with the detection of a release 906 of the physical touching of the content display interface. The physical touching may be performed by a finger or a stylus. The path may be essentially one-dimensional, as illustrated in FIG. 5A (even though a user cannot usually perform a perfectly straight line and the path will inherently be two-dimensional), or two-dimensional, as illustrated in FIGS. 1, 5A, 5B, and 9.

To convert the path into a navigation amount that can be used by the content navigation system, a length of the path may be computed. In one embodiment, the navigation amount is the overall length of the path. When the path is a two-dimensional path, a two-dimensional grid may be used to compute the length of the path. Using a two-dimensional path, the length of the path may include at least one loop 908 to increase its length (e.g., a finger going 3 cm to the right then 1 cm to the left means the path has a length of 4 cm). Therefore, the user might not need to use a whole dimension of the content display interface to input the path, but can easily do it on a small, localized portion of the content display interface, doing loops or similar shapes. In one example, the navigation interval is the length of the path going in one direction, such as left and right (e.g., a finger going 3 cm to the right then 1 cm to the left means the path has a length of 2 cm to the right and not a length of 4 cm). This allows movement forward and backward based on the direction of the path. In this case, the loop would have a null effect (or close to null) on the length of the path. In one embodiment, the navigation interval is the length of a one-dimensional projection 910 of the two-dimensional path (e.g., a projection orthogonal to the seekbar or parallel with the seekbar). In one embodiment, the navigation interval is the length of the projection of the path based on the direction of the path, such as left and right (e.g., a projection, of a path, going 3 cm to the right then 1 cm to the left means the projection of the path has a length of 2 cm to the right).

In some examples, loop 908 may indicate that the user wishes to select a more precise navigation interval. Put another way, loop 908 activates a slower scrubbing speed when choosing the navigation interval, allowing the user to make a more granular selection of their intended navigation interval. In some examples, the substantially linear sections of the path correlate the distance of the path with one scaling parameter and the substantially circular (e.g., loop 908)

sections of the path correlate the distance of the path with a second scaling parameter, enabling the user to have more granular control of the navigation interval, so they can more accurately choose a portion of the media content item 112 to view.

Figure 10:
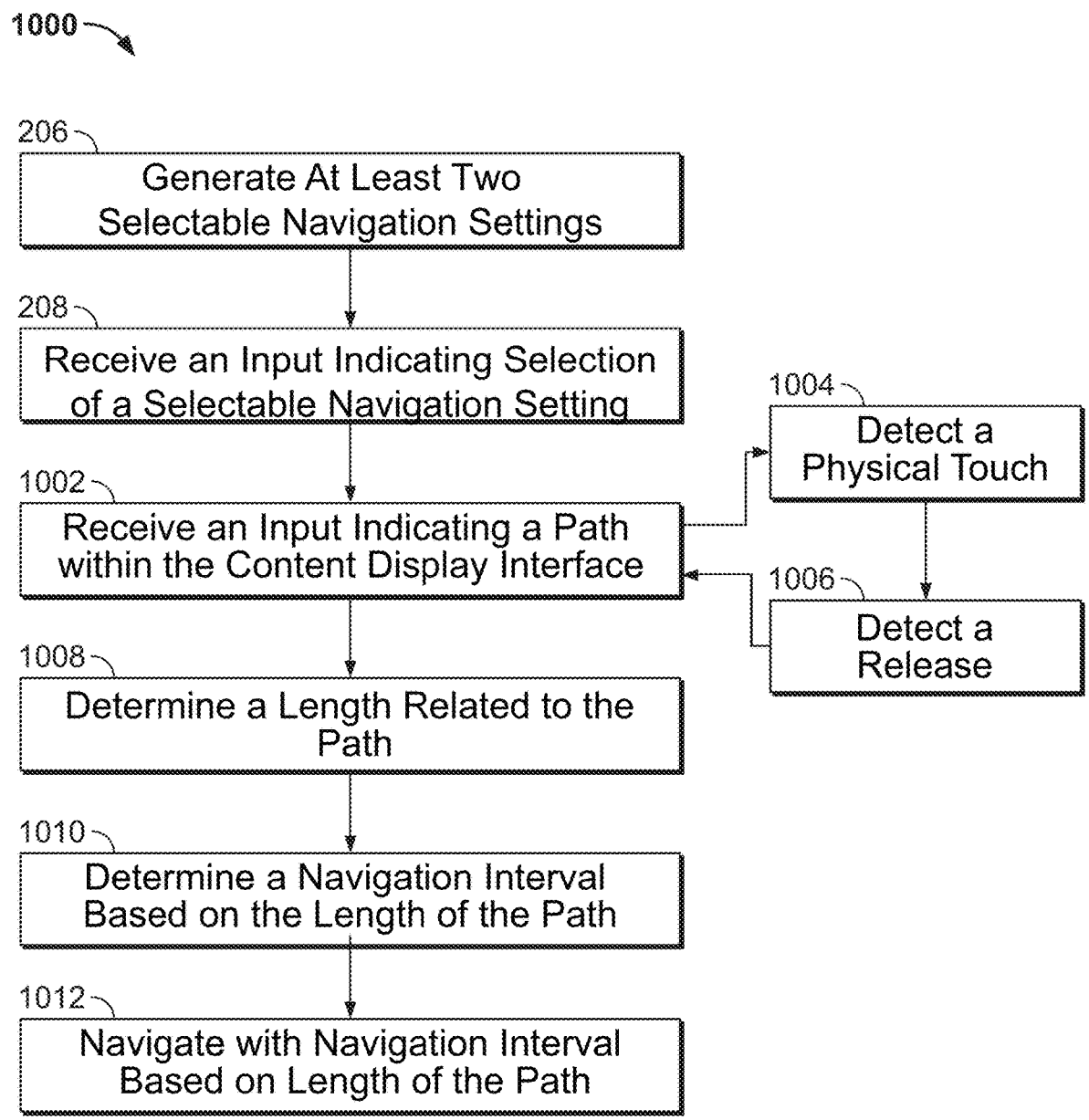
FIG. 10 is an illustrative flowchart of a process for navigating within the navigation interval using a path, according to some examples of the disclosure.

FIG. 10 is an illustrative flowchart of a process 1000 where the navigation amount is determined based on a path on the content display interface. After step 208, control circuitry 304 may receive, at 1002, an input indicating a path within the content display interface. Step 1002 may comprise detecting, at 1004, physical touching of the content display interface and detecting, at 1006, the release of the physical touching to terminate the path. In one example, the detection, at step 1004, is the reception of the input indicating a selection of a navigation setting, at step 208, so that the user chooses the navigation setting, and, during the same movement of the hand or finger, proceeds with the path, determining the navigation amount. At 1008, control circuitry 304 determines a length associated with the path. As described above, the length may be the overall length of the path, a portion of the overall length of the path, or the length of a projection of the path. At 1010, control circuitry 304 determines a navigation interval based on the length of the path. Finally, at 1012, corresponding to step 214, control circuitry 304 navigates the media content item based on the navigation interval based on the determined length.

In a further embodiment, control circuitry 304 may determine a forward or backward direction for the content navigation operation. The detection may occur while receiving an input indicating a selection of a navigation setting, at 208, or may be independent. In one implementation, the determination may be based on detecting an initial forward or reverse navigation motion within the content display interface, for instance, just after detection of the physical touching, at 1004, using the direction of the beginning of the path.

All of the features disclosed in this specification (including any accompanying claims, abstract, and drawings), and/or all of the steps of any method or process so disclosed, may be combined in any combination, except combinations where at least some of such features and/or steps are mutually exclusive.

Each feature disclosed in this specification (including any accompanying claims, abstract, and drawings), may be replaced by alternative features serving the same, equivalent or similar purpose unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed. The claims should not be construed to cover merely the foregoing embodiments, but also any embodiments which fall within the scope of the claims.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

All of the features disclosed in this specification (including any accompanying claims, abstract, and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method comprising:
   generating for display, on a device, media content;
   receiving a user input comprising movement along a two-dimensional input path drawn using a user interface of the device, wherein the movement of the user input is unconstrained by the user interface of the device and wherein the two-dimensional input path comprises a two-dimensional loop;
   computing, in two dimensions, an overall length of the two-dimensional loop; and
   navigating from a current play position of the media content to a shifted play position of the media content selected based on the computed overall length of the two-dimensional loop.

2. The method of claim 1, wherein the receiving the input path drawn using the user interface further comprises detecting a physical touch, dragging, direction of dragging and release across a display of the device.

3. The method of claim 1, wherein the computing the overall length of the two-dimensional input path comprises:
   computing the length of the two-dimensional input path as the length of the two-dimensional input path in one direction.

4. The method of claim 1, wherein the computing the overall length of the two-dimensional input path comprises:
   computing the length of the two-dimensional input path as the length of a one-dimensional projection of the two-dimensional input path.

5. The method of claim 1, wherein the computing the overall length of the two-dimensional input path comprises:
   computing the length of the two-dimensional input path as the length of a projection of the two-dimensional input path based on a direction of the two-dimensional input path.

6. The method of claim 1, wherein the navigating from the current play position of the media content to the shifted play position of the media content comprises:
   determining a navigation interval based on the length of the two-dimensional input path; and
   either adding the navigation interval to the current play position; or
   subtracting the navigation interval from the current play position.

7. The method of claim 6, further comprising:
- determining a first direction of the two-dimensional input path when the navigation interval is added to the current play position; and
- determining a second direction of the two-dimensional input path when the navigation interval is subtracted from to the current play position, wherein: the first direction indicates a forward direction from the current play position and the second direction indicates a backwards direction from the current play position.

8. The method of claim 6, wherein the media content comprises:
- a first media content segment with a first length; and
- a second media content segment with a second length, and the method further comprises:
- applying the navigation interval to the current play position of the first media content segment resulting in an expected shifted position, wherein the expected shifted position exceeds the first length; and
- playing the second media content segment at a shifted play position equal to the expected shifted position less the first length.

9. The method of claim 1, further comprising generating for display on a content display interface at least one of:
- a preview window representing the media content at the shifted play position;
- an elapsed time indication of the shifted play position; and
- wherein the content display interface includes temporal markers indicating positions within the media content represented by a seek bar; and wherein:
- the content display interface includes a marker representing an expected shift position during reception of the two-dimensional input path.

10. A system for navigating media content, the system comprising:
- input/output circuitry configured to:
  - generate for display on a device, the media content;
  - receive a user input comprising movement along a two-dimensional input path using a user interface of the device, wherein the movement of the user input is unconstrained by the user interface of the device and wherein the two-dimensional input path comprises a loop; and
- control circuitry configured to:
  - compute, in two dimensions, an overall length of the two-dimensional loop; and
  - navigate from a current play position of the media content to a shifted play position of the media content selected based on the computed overall length of the two-dimensional loop.

11. The system of claim 10, wherein the control circuitry is configured to compute the overall length of the two-dimensional input path by:
- computing the length of the two-dimensional input path as the length of the two-dimensional input path in one direction.

12. The system of claim 10, wherein the control circuitry is configured to compute the overall length of the two-dimensional input path by:
- computing the length of the two-dimensional input path as the length of a one-dimensional projection of the two-dimensional input path.

13. The system of claim 10, wherein the control circuitry is configured to compute the overall length of the two-dimensional input path by:
- computing the length of the two-dimensional input path as the length of a projection of the two-dimensional input path based on a direction of the two-dimensional input path.

14. A non-transitory computer-readable medium having instructions encoded thereon that when executed by control circuitry cause the control circuitry to:
- generate for display, on a device, media content;
- receive a user input comprising movement along a two-dimensional input path drawn using a user interface of the device, wherein the movement of the user input is unconstrained by the user interface of the device and wherein the two-dimensional input path comprises a loop;
- compute, in two dimensions, an overall length of the two-dimensional input path loop; and
- navigate from a current play position of the media content to a shifted play position of the media content selected based on the computed overall length of the two-dimensional input path loop.

15. The non-transitory computer-readable medium of claim 14, wherein the instructions cause the control circuitry to compute the overall length of the two-dimensional input path by:
- computing the length of the two-dimensional input path as the length of the two-dimensional input path in one direction.

16. The non-transitory computer-readable medium of claim 14, wherein the instructions cause the control circuitry to compute the overall length of the two-dimensional input path by:
- computing the length of the two-dimensional input path as the length of a one-dimensional projection of the two-dimensional input path.

17. The non-transitory computer-readable medium of claim 14, wherein the instructions cause the control circuitry to compute the overall length of the two-dimensional input path by:
- computing the length of the two-dimensional input path as the length of a projection of the two-dimensional input path based on a direction of the two-dimensional input path.

* * * * *